United States Patent [19]

Nambu et al.

[11] Patent Number: 5,063,114

[45] Date of Patent: Nov. 5, 1991

[54] COATED MATERIAL

[75] Inventors: Toshiro Nambu, Hyogo; Hirotoshi Kawaguchi, Hyogo; Hisao Furukawa, Hyogo; Yasushi Kato, Hyogo, all of Japan

[73] Assignee: Kanegafuchi Kagaku Kogyo Kabushiki Kaisha, Osaka, Japan

[21] Appl. No.: 505,393

[22] Filed: Apr. 6, 1990

[30] Foreign Application Priority Data

Apr. 6, 1989 [JP] Japan .................................... 1-87734

[51] Int. Cl.$^5$ .............................................. B32B 9/04
[52] U.S. Cl. .................................. 428/447; 428/384; 428/389; 525/103
[58] Field of Search ....................... 428/447, /389, 381, 428/384, 412; 525/103, 491; 522/99

[56] References Cited

U.S. PATENT DOCUMENTS 4,719,146  1/1988  Hohage et al. ...................... 428/412

Primary Examiner—Merrell C. Cashion, Jr.
Assistant Examiner—D. S. Nakarani
Attorney, Agent, or Firm—Armstrong, Nikaido, Marmelstein, Kubovcik & Murray

[57] ABSTRACT

A coated material obtained by applying a coat containing a metallic powder and/or a coloring pigment to a substrate and further applying a topcoat clear coating thereon, wherein said topcoat clear coating is a heat-hardening coat which contains a composition comprising a hydroxyl group-containing resin, a hydrolyzable silyl group-containing polymer and a hardening catalyst as the main component. This coated material is excellent in, for example, appearance, acid resistance, staining resistance, adhesiveness and hardness.

18 Claims, No Drawings

COATED MATERIAL

FIELD OF THE INVENTION

This invention relates to a coated material which is obtained by a finishing method of either a so-called "two-coat one-bake" system which comprises applying a metallic base coat containing a metallic powder and/or a solid color containing a coloring pigment (which will be generally called a base coat, including the metallic base coat or the solid color coat) to a material, further applying a topcoat clear coating thereon and then thermal curing; or a so-called "two-coat two-bake" system which comprises applying a base coat to a material, thermal curing the same, further applying a topcoat clear coating thereon and then thermal curing the same.

BACKGROUND OF THE INVENTION

Automotive finishing methods include metallic color finishing and solid color finishing. The former method commonly comprises applying a metallic base coat and then further applying a clear coat thereon by the wet-on-wet method followed by thermal curing, namely, a two-coat one-bake system. Since an acryl melamine resin coat is employed as the clear coat, the coating thus obtained is poor in, for example, acid resistance and staining resistance. Thus it has been required to overcome these disadvantages.

In the case of the solid color finishing, on the other hand, a one-coat one-bake system is generally employed with the use of an alkyd melamine resin coat. Recently, it has been required to improve the appearance of the finished coating and to enhance properties thereof such as weathering resistance, acid resistance and staining resistance. In order to satisfy these requirements, the application of a clear coat on a solid color has been proposed. However no satisfactory coating material has been obtained so far by this method.

Known thermal cured coats (for example, acryl melamine and alkyd melamine) employed in various coatings for, for example, the exterior of architectural structures, automobiles, industrial machines, steel furniture, appliances and plastics contain melamine as a crosslinking agent. Thus these coats suffer from an unsolved problem, namely, the odor of the melamine resin.

SUMMARY OF THE INVENTION

Under these circumstances, we have conducted extensive studies in order to solve the above-mentioned problems. As a result, we have determined that these problems can be solved by using a specific thermal cured coat, which will be described hereinbelow, as a transparent topcoat clear coating in the two-coat system and that a coated material excellent in acid resistance, staining resistance and weathering resistance can be obtained thereby.

Accordingly, the present invention is a coated material obtained by applying a coat containing a metallic powder and/or a coloring pigment to an article and further applying a topcoat clear coating thereon, wherein said topcoat clear coating comprises a siloxy or siloxane crosslinking type thermocurable coating which comprises (A) a hydroxyl group-containing acrylic resin;
(B) an alkoxysilyl group-containing copolymer represented by formula:

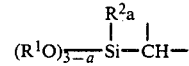

where $R^1$ represents $C_{1-10}$ alkyl group; $R^2$ represents a monovalent hydrocarbon group selected from the group consisting of hydrogen atom, alkyl group, aryl group, and aralkyl group; and a represents 0 or integer of 1 or 2; and (C) curing catalyst.

DETAILED DESCRIPTION OF THE INVENTION

The topcoat clear coating to be used in the present invention is be described below.

Examples of the hydroxyl group-containing acrylic resin contained in the topcoat clear coating, which resin will be called hereinafter as the hydroxyl group-containing acrylic resin (A) or the component (A), show wether resistance, chemical resistance and water resistance because a main chain comprises substantially acrylic copolymer chain.

The hydroxyl group-containing acrylic resin (A) may be prepared by, for example, a copolymerizing hydroxyl group-containing monomer with an acrylic acid, a methacrylic acid and derivatives thereof. Examples of hydroxyl group-containing monomer, which are not restricted, include a 2-hydroxyethyl(meth)acrylate, a 2-hydroxypropyl(meth)acrylate, a Praccel FA-1 (caprolactone acrylate (n=1)), a Praccel FA-4 (polycaprolactone acrylate (n=4)), a Praccel FM-1 (caprolactone methacrylate (n=1)), a Praccel FM-4 (polycaprolactone methacrylate (n=4)), manufactured by Daisel Chemical Industires Ltd., and a 2-hydroxyethyl vinyl ether. These hydroxy group-containing monomer may be used singly or in combination of two or more.

A monomer, which is copolymerizable with the hydroxyl group-containing monomer, is not restricted, and includes, for example, a (meth)acrylic acid, a methyl(meth)acrylate, a 2-an ethylhexyl(meth)acrylate, a stearyl(meth)acrylate, a benzyl(meth)acrylate, a cyclohexyl(meth)acrylate, a trifluoroethyl(meth)acrylate, a pentafluoropropyl(meth)acrylate, a perfluorocyclohexyl(meth)acrylate, a (meth)acrylonitrile, a glycidyl(meth)acrylate, a dimethylaminoethyl(meth)acrylate, a diethylaminoethyl(meth)acrylate, a (meth)acrylamide, an α-ethyl(meth)acrylamide, a N-butoxymethyl(meth)acrylamide, a N,N-dimethylacrylamide, a N-methylacrylamide, an acryloxyl morpholine, a N-methylol(meth)acrylamide, an Arouics M-5700, manufactured by Toa Gosei Chemical Industries Co., Ltd., a Macromer AS-6 (polystyrene having methacryloyl at one terminal end), AN-6 (copolymer(styrene) having methacryloyl at one terminal end/acrylonitrite), AA-6 (polymethylmethacrylate having methacryloyl at one terminal end), AB-6 (polybutylacrylate having methacryloyl at one terminal end), AK-5 (organo polysiloxane having methacryloyl at one terminal end), manufactured by Toa Gosei Chemical Industries Co., Ltd., phosphate ester group-containing vinyl compound, which is condensation product of α,β-ethylenically unsaturated carboxylic acid hydroxy esters, such as a (meth)acrylic acid hydroxyalkyl ester, and a phosphoric acid or a phosphoric acid ester, and a (meth)acrylate containing urethane or siloxane bondings.

The copolymer may contain urethane or siloxane bonding in a main chain in an amount of not exceeding 50 parts by weight, and may contain other monomers than (meth)acrylic acid derivatives. Example of these monomers, which are not restricted, include a styrene, an α-methylstrene, a chlorostyrene, a styrene sulfonate, an aromatic hydrocarbon group containing vinyl compounds such as a vinyl toluene, unsaturated carboxylic acids such as a maleic acid, a fumalic acid, an itaconic acid, etc., or salts, and anhydrates, such as fumalic acid anhydrate, or unsaturated carboxylic acid ester thereof, such as diester or half ester with $C_{1-20}$, straight or branched chain alcohol, vinyl ester or allyl compound such as a vinyl acetate, a vinyl propionate, a diallylphthalate; an amino group-containing vinyl compound such as a vinylpyridine, an aminoethyl vinylether; an amide group-containing vinyl compound such as an itaconamide, a crotonamide, a malediamide, a fumardiamide, and a N-vinyl pyrrolidone; and other vinyl compounds such as a methyl vinylether, a cycloxyl vinylether, a vinyl chloride, a vinylidene chloride, a chloroprene, a propyrene, a butadiene, an isoprene, a fluoroolephine maleimide, a N-vinyl imidazole, and a vinyl sulfonic acid.

The acrylic copolymer is preferably prepared by a solution polymerization method using an azo type radical initiater such as an azobis-isobutylonitrile in view of facility in polymerization. In the solution polymerization, a chain reaction transfer agent such as a n-dodecylmercaptane, a t-dodecylmercaptane, a n-butylmercaptane may be used for controlling a molecular weight. A polymerization solvent is not restricted provided that it is not reactive with the alkoxysilyl group-containing polymer.

The hydroxyl group-containing acrylic resin may be of none-aqueous dispersion, in which a polymer particle insoluble in an organic solvent is dispersed. The hydroxyl group-containing acrylic resin (A) may be used alone or in combination of two or more.

Neither the molecular weight nor hydroxyl number of the hydroxyl group-containing resin (A) is restricted. Thus commonly employed ones may be used in the present invention. From the view point of coating properties (for example, strength, durability), it is preferred that said a hydroxyl group-containing resin (A) have a number-average molecular weight of from 1,500 to 40,000 and a hydroxyl number of from 10 to 300 mg KOH/g. An one of these components (A) or a mixture thereof can be used.

The alkoxysilyl group-containing polymer contained in the topcoat clear coating, which will be called the alkoxysilyl group-containing acrylic copolymer (B) or the component (B) hereinafter, is a polymer having at least one, and preferred two or more, per molecule at a terminal or a side chain, alkoxysilyl group represented by formula:

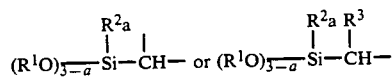

wherein $R^1$ represent $C_{1-10}$ alkyl group; $R^2$ and $R^3$ each, which may be the same or different, represents a monovalent hydrocarbon group selected from the group consisting of a hydrogen atom, a alkyl group, an aryl group, and an aralkyl group, these groups preferably have 1 to 10 carbon atoms; and a represents 0 or an integer of 1 or 2. The alkoxysilyl group-containing an acrylic copolymer has excellent properties in weather-, chemicals- and water-resistances since the main chain thereof comprises substantially an acrylic copolymer chain. Further, since the alkoxysilyl group is connected to a carbon atom, water-, alkali- and acid-proof is further remarkably improved. This alkoxysilyl group would react with the hydroxyl group in said hydroxyl group-containing a resin (A) so as to contribute to crosslinking. Simultaneously, the alkoxy groups react with each other so as to contribute crosslinking. Namely, the present invention provides a coated material obtained by taking advantage of the crosslinking reactions between the hydroxyl groups in the hydroxyl group-containing an acrylic resin (A) and the alkoxysilyl groups in the alkoxysilyl group-containing a polymer (B). Therefore it clearly differs from conventional containing systems wherein melamine is employed as a crosslinking agent.

When said component (B) contains less than one alkoxysilyl group per molecule, the solvent resistance of the topcoat clear coating is lowered.

From the viewpoint of topcoat clear coating properties, the number-average molecular weight of component (B) preferred ranges from 1,000 to 30,000.

The alkoxysilyl group-containing acrylic copolymer (B) may be obtained by, for example, a copolymerizing acrylic acid, a methacrylic acid and derivatives thereof with the alkoxysilyl group-containing monomer. The monomer is not particularly restricted. Examples thereof include, for example, a methyl(meth)acrylate, an ethyl(meth)acrylate, a butyl(meth)acrylate, a 2-ethylhexyl(meth)acrylate, a stearyl(meth)acrylate, a benzyl(meth)acrylate, a cyclohexyl(meth)acrylate, a trifluoroethyl(meth)acrylate, a pentafluoropropyl(meth)acrylate, a perfluorocyclohexyl(meth)acrylate, a (meth)acrylonitrile, a glycidyl(meth)acrylate, a dimethylaminoethyl(meth)acrylate, a diethylaminoethyl(meth)acrylate, a (meth)acrylamide, an α-ethyl(meth)acrylamide, a N-butoxymethyl(meth)acrylamide, a N,N-dimethyl acrylamide, a N-methyl acrylamide, an acryloyl morpholine; a 2-hydroxyethyl(meth)acrylate, a 2-hydroxypropyl (meth)acrylate, a N-methylol(meth)acrylamide, an Aronix M-5700

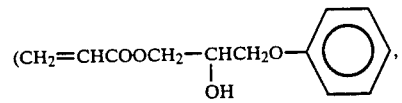

mfd. by Toa Gosei Chemical Industry Co., Ltd.), a Placcel FA-1, a Placcel FA-4, a Placcel FM-1 and a Placcel FM-4 (mfd. by Daicel Chemical Industries, Ltd.), a phosphoric acid ester group-containing vinyl compound which is condensation product of α, β-ethylenically unsaturated carboxylic acid hydroxyalkyl ester and phosphoric acid or phosphoric acid esters, and (meth)acrylate containing urethane or siloxane connectings.

The copolymer may contain urethane or siloxane bondings or monomer other than (meth)acrylic acid derivative in the main chain in an amount of not exceeding 50 parts by weight. Example of the monomers, which is not restricted, includes aromatic hydrocarbon vinyl compounds such as a styrene, an α-methylstyrene, a chlorostyrene, a styrene sulfonic acid, a 4-hydroxystyrene, and a vinyl toluene; unsaturated carboxylic unsaturated carboxylic acids such as a maleic acid, a fumaric acid and an itaconic acid, salts thereof (for example, alkaline metal salts, ammonium salts, amine salts), acid anhydrides thereof (for example, a maleic anhydride); and esters thereof with unsaturated carboxylic acid such as diester or half ester of $C_{1-12}$ straight or branched chain alcohol; vinyl ester or allyl compounds such as a vinyl acetate, a vinyl propionate, a diallylphthalate; an amino group-containing vinyl compound such as a vinyl pyridine, and an aminoethyl vinylether; an amide group-containing vinyl compound such as an itacondiamide, a crotonomide, a malediamide, a fumardiamide, and a N-vinyl pyrrolidone; and other vinyl compounds such as a 2- hydroxyethyl vinyl ether, a methyl vinyl ether, a cyclohexyl vinyl ether, a vinyl chloride, a vinylidene chloride, a chloroprene, a propylene, a butadiene, an isoprene, a fluoroolefin, a maleimide, a N-vinyl imidazole and a vinyl sulfonic acid.

The above-mentioned alkoxysilyl group-containing monomer is not particularly restricted, so long as it contains alkoxysilyl group(s). Examples thereof include:

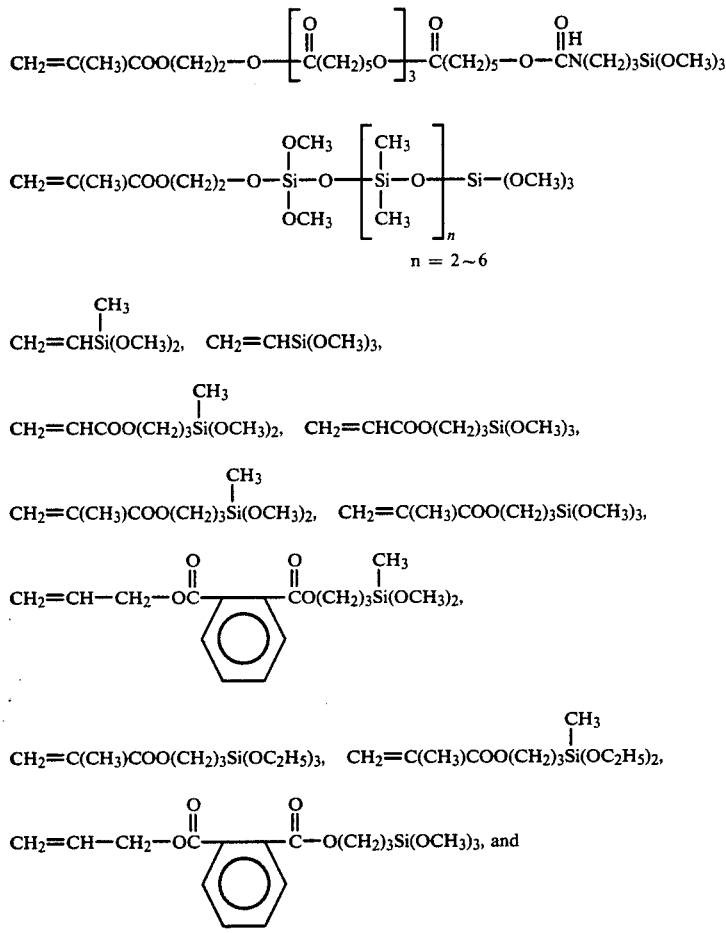

a methacrylate having alkoxysilyl group at a polymer terminal through urethane or siloxane bonding.

An one of these compounds or a mixture thereof can be used.

The unit derived from the alkoxysilyl group-containing monomer in the hydrolyzable silyl group-containing polymer can be present in preferred ranges from 5 to 90% (by weight, the same will apply hereinafter), and more preferred from 11 to 70%, from the viewpoint of the topcoat clear coating properties.

The alkoxysilyl group-containing vinyl polymer can be produced by the methods described in, for example, JP-A-54-36395, JP-A-57-36109 and JP-A-58-157810. (The term "JP-A" as used herein means an unexamined published Japanese patent application.) It is preferred to produce said polymer by solution polymerization with the use of an azo radical initiator such as azobisisobutyronitrile, when taking the case of the synthesis into consideration.

When the molecular weight is to be controlled in the above-mentioned solution polymerization, a chain transfer agent selected from among, for example, n-dodecyl mercaptan, t-dodecyl mercaptan, n-butyl mercaptan, γ-mercaptopropyl trimethoxysilane, γ-mercaptopropyl triethoxysilane, γ-mercaptopropyl methyldimethoxysilane, γ-mercaptopropyl methyldiethoxysilane, $(H_3CO)_3$—Si—S—S—$Si(OCH_3)_3$ and $(H_3CO)_3Si$—$S_8$—$Si(OCH_3)_3$ can be used. When a chain transfer agent having a alkoxysilyl group in a molecule (for example, γ-mercaptopropyl trimethoxysilane) is used for controlling the molecular weight, in particular, an alkoxysilyl group can be introduced into the terminal of the polymer.

As the solvent to be used in the above-mentioned solution polymerization, any solvent selected from among hydrocarbons, for example, toluene, xylene, n-hexane, cyclohexane; acetates, for example, ethyl acetate, butyl acetate; alcohols, for example, methanol, ethanol, isopropanol, n-butanol; ethers, for example, ethyl cellosolve, butyl cellosolve, cellosolve acetate and ketones, for example, methyl ethyl ketone, aceto ethylacetate, diacetone alcohol, methyl isobutyl ketone, acetone, can be employed, so long as it is not reactive with the alkoxysilyl group-containing polymer.

Any one of these alkoxysilyl group-containing polymers or a mixture thereof can be used.

The ratio of the alkoxysilyl group-containing polymer (B) to the component (A) can be appropriately selected depending on, for example, the intended use. It is preferred that the ratio by weight of the component (A) to the component (B) ranges from 9/1 to 1/9, still preferred from 8/2 to 2/8. When the ratio of the component (A) to the component (B) exceeds 9/1, the resulting topcoat clear coating shows poor water resistance. When said ratio is lower than 1/9, on the other hand, the desired effects of the use of the component (A) of, for example, improving the appearance of the coated material and elevating the hardness thereof cannot be satisfactorily achieved.

Examples of the hardening catalyst contained in the topcoat clear coating, which will be called the hardening catalyst (C) hereinafter, include organotin compounds such as dibutyltin dilaurate, dioctyltin dilaurate, dioctyltin dimaleate and tin octanoate; phosphoric acid and phosphates such as phosphoric acid, monomethyl phosphate, monoethyl phosphate, monobutyl phosphate, monooctyl phosphate, monodecyl phosphate, dimethyl phosphate, dioctyl phosphate and didecyl phosphate; addition reaction products obtained from an epoxy compound such as propylene oxide, butylene oxide, cyclohexene oxide, glycidyl methacrylate, glycidol, acryl glycidyl ether, γ-glycidoxypropyl trimethoxysilane, γ-glycidoxypropyl triethoxysilane, γ-glycidoxypropylmethyl dimethoxysilane,

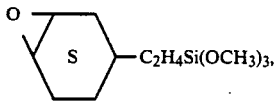

Cardula E (aliphatic acid mono-glycidyl mfd. by Petrochemical Shell Epoxy Co.); Epicoat 828 or Epicoat 1001 (mfd. by Petrochemical Shell Epoxy Co.) and phosphoric acid and/or a monoacidic phosphate; organic titanate compounds; acidic compounds such as maleic acid and p-toluenesulfonic acid; amines such as hexylamine, di-2-ethylhexylamine, N,N-dimethyldodecylamine and dodecylamine; reaction products or mixtures obtained from these amines and acidic phosphates; and alkaline compounds such as sodium hydroxide and potassium hydroxide.

Among these compounds, organotin compounds, acidic phosphates, reaction products obtained from acidic phosphates and amines, saturated or unsaturated polyvalent carboxylic acids or acid anhydrides thereof, reactive silicone compounds, organic titanate compounds, organic aluminum compounds, and a mixtures of these are particularly preferred as the hardening catalyst (C), since they are highly active.

Any one of these hardening catalysts or a mixture thereof can be used.

The hardening catalyst (C) can be used in an arbitrary amount without restriction. Generally speaking, it can be used in an amount of 0.1 to 20 parts (by weight, the same will apply hereinafter), preferred 0.1 to 10 parts, based on 100 parts of the solid components (A) and (B). When the amount of component (C) is less than 0.1 part, the hardness of the product might be lowered. When it exceeds 20 parts, the appearance of the topcoat clear coating might be deteriorated.

The topcoat clear coating can optionally contain a dehydrating agent. A dehydrating agent can impart stability over a long period and high safety, which enables the repeated use, to the topcoat clear coating.

Examples of the dehydrating agent include hydrolyzable ester compounds such as methyl orthoformate, ethyl orthoformate, methyl orthoacetate, ethyl orthoacetate, methyl trimethoxysilane, γ-methacryloxy propyltrimethoxysilane, vinyl trimethoxysilane, methyl silicate and ethyl silicate. These hydrolyzable ester compounds can be added either before the polymerization of the alkoxysilyl group-containing polymer (B), during the polymerization or after polymerization.

The amount of the dehydrating agent is not particularly restricted. Generally speaking, it can be added in an amount of 100 parts or below, preferred 50 parts or below, based on 100 parts of the solid components (A) and (B).

It is furthermore possible to enhance the effect of the dehydrating agent by using a dehydration promoter therewith. Examples of compounds effective as the dehydration promoter include inorganic acids such as hydrochloric acid, sulfuric acid, phosphoric acid and nitric acid; organic acids such as formic acid, acetic acid, oxalic acid, benzoic acid, phthalic acid, p-toluenesulfonic acid, acrylic acid and methacrylic acid; metal salts of carboxylic acids such as alkyltitanates and lead octanoate; carboxylate-type organotin compounds such as tin octanoate, dibutyltin dilaurate and dioctyltin maleate; mercaptide-type organotin compounds such as monobutyltin sulfide and dioctyltin mercaptide; organotin oxides such as dioctyltin oxide; organotin compounds obtained by reacting an organotin compound with an ester such as ethyl silicate, ethyl silicate 40, dimethyl maleate or dioctyl phthalate; amines such s tetraethylenepentamine, triethylenediamine and N-β-aminoethyl-γ-aminopropyl trimethoxysilane; and alkali catalysts such as potassium hydroxide and sodium hydroxide. Among these compounds, organic acids, inorganic acids and organotin compounds are particularly effective.

The dehydration promoter can be used in an amount of from 0.0001 to 20 parts, preferred from 0.001 to 10 parts, based on 100 parts of the dehydrating agent. When the dehydration promoter also serves as the above-component (C), it can be used in such an amount as specified with respect to the component (C).

A solvent can be used for the topcoat clear coating. Any solvent can be selected therefor, so long as the solvent is innert.

Examples of such a solvent include aliphatic hydrocarbons, aromatic hydrocarbons, halogenated hydrocarbons, alcohols, ketones, esters, ethers, alcohol esters, ketone alcohols, ether alcohols, ketone ethers, ketone esters and ester ethers commonly employed in paints and coatings. Among these solvents, those containing alkyl alcohols are preferred, since the stability of the topcoat clear coating can be improved thereby.

As the above-mentioned alkyl alcohols, those wherein an alkyl group has 1 to 10 carbon atoms are preferred. Examples thereof include methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol and celloslve. These alcohols can be generally used in an amount of 100 parts or less, preferred 50 parts or less, based on 100 parts of the solid components (A) and (B), although the present invention is not restricted thereto.

When the components (A) and (B) of the topcoat clear coating are mixed together, the combined use of an alcohol and a dehydration promoter exerts a remarkable effect on the keeping stability of the resulting mixture. The amount of the solvent can vary depending on the molecular weights and compositions of the components (A) and (B). It can be controlled so as to give a practically required solid content or viscosity.

The topcoat clear coating can further contain a polyorganosiloxane so as to impart, for example, water repellency and staining resistance to the hardened coating.

Any polyorganosiloxane can be used therefor, so long as it has a reactive functional group and is compatible with the hydroxyl group-containing acrylic resin (A) and the alkoxysilyl group-containing acrylic copolymer polymer (B). Said polyorganosiloxane can have an arbitrary structure, for example, linear, branched, network or cyclic structure. Examples of the organo group include hydrogen atom, alkyl groups, alkenyl groups, aryl groups, a methyl group, an ethyl group, a propyl group, a butyl group, a hexyl group, an allyl group and a phenyl group. Among these organo groups, methyl, vinyl and phenyl groups are advantageous in practice, since they are produced on an industrial scale and are less expensive. Preferred examples of the above-mentioned reactive functional group include a silanol group, an alkoxysilyl group, an alcholic hydroxyl group, a glycidyl group, an amino group a mercapto group, a carboxyl group, an amide group, a vinyl group and a (meth)acryloxy group. Among these groups, a silanol group, an alkoxysilyl group and an alcholic hydroxyl group

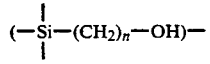

are preferred. It is preferred that the polyorganosiloxane have one or more reactive functional groups per molecule.

The molecular weight of the polyorganosiloxane can be arbitrarily selected within a range capable of providing compatibility. However the compatibility decrease with an increase in molecular weight. Therefore, the polyorganosiloxane preferably has 2 to 100, and more preferably 3 to 50, silicon atoms.

Examples of the polyorganosiloxane include silicone rubber, silicone varnish, silicone intermediates for modifying organic polymers, reactive polydimethylsiloxanes used as a reactive silicone oil, reactive polydiphenylsiloxanes, reactive polymethylphenylsiloxanes obtained by copolymerizing dimethylsiloxane and diphenylsiloxane,

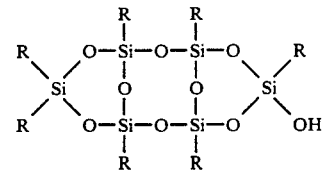

wherein R represents a group selected from a phenyl group, a $C_{1-4}$ alkyl group and a hydroxy group.

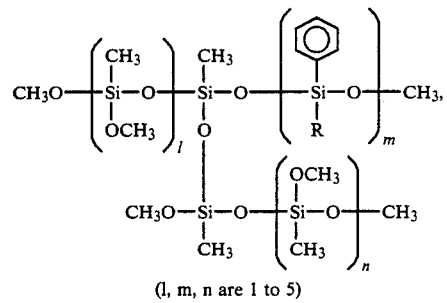

(l, m, n are 1 to 5)

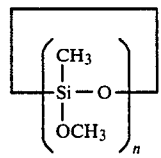

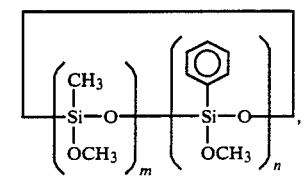

(n = 2~20, m = 1~10, n = 1~10)

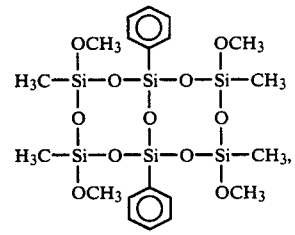

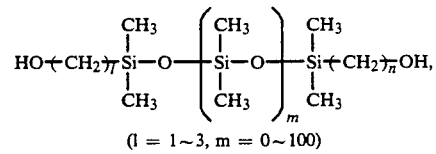

(l = 1~3, m = 0~100)

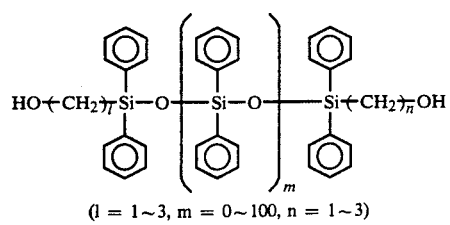

(l = 1~3, m = 0~100, n = 1~3)

-continued

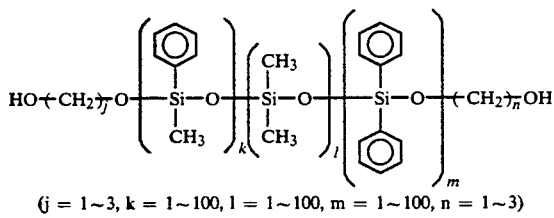

(j = 1~3, k = 1~100, l = 1~100, m = 1~100, n = 1~3)

The polyorganosiloxane can generally be used in an amount of 100 parts or below, preferred 50 parts or below, per 100 parts of the solid components (A) and (B).

The topcoat clear coating can further contain silane compounds, condensation products thereof, reaction products thereof or a mixture thereof so as to improve its properties, for example, adhesiveness, hardness, and solvent resistance.

Examples of the above-mentioned silane compounds include methyl silicate, methyltrimethoxysilane, butyltrimethoxysilane, octyltrimethoxysilane, dodecyltrimethoxysilane, phenyltrimethoxysilane, vinyltrimethoxysilane, $\gamma$-methacryloxypropyltrimethoxysilane, $\gamma$-acryloxypropyltrimethoxysilane, $\gamma$-glycidoxypropyltrimethoxysilane, $\gamma$-mercaptopropyltrimethoxysilane, $\gamma$-aminopropyltrimethoxysilane, N-$\beta$-aminoethyl-$\gamma$-propyltrimethoxysilane, dimethyldimethoxysilane, diethyldimethoxysilane, dibutyldimethoxysilane, diphenyldimethoxysilane, vinylmethyldimethoxysilane, $\gamma$-methacryloxypropylmethyldimethoxysilane, trimethylmethoxysilane, triethylmethoxysilane, triphenylmethoxysilane, ethyl silicate, methyltriethoxysilane, ethyltriethoxysilane, butyltriethoxysilane, octyltriethoxysilane, dodecyltriethoxysilane, phenyltriethoxysilane, vinyltriethoxysilane, $\gamma$-methacryloxypropyltriethoxysilane, $\gamma$-acryloxypropyltriethoxysilane, $\gamma$-glycidoxypropyltriethoxysilane, $\gamma$-mercaptopropyltriethoxysilane, $\gamma$-aminopropyltriethoxysilane, N-$\beta$-aminoethyl-$\gamma$-propyltriethoxysilane, dimethyldiethoxysilane, diethyldiethoxysilane, dibut-vldiethoxysilane, diphenyldiethoxysilane, vinylmethyldiethoxysilane, $\gamma$-methacryloxypropylmethyldiethoxysilane, trimethylethoxysilane, triethylethoxysilane and triphenylmethoxysilane.

A partially hydrolyzed condensation product of these silane compounds can be readily obtained by adding a required amount of water to silane compound(s) optionally together with a small amount of a condensation catalyst such as hydrochloric acid or sulfuric acid and conducting the condensation at from room temperature to 100° C. while removing the alcohol thus formed.

Examples of a partially hydrolyzed condensation product of methyl silicate having a methoxysilyl group include Methyl silicate 47, Methyl silicate 51, Methyl silicate 55, Methyl silicate 58 and Methyl silicate 60 (mfd. by Nippon Colcoat Co.). Examples of a partially hydrolyzed condensation product of methyltrimethoxysilane or dimethyldimethoxysilane having a methoxysilyl group include AFP-1, AFP-3, AFP-6, KR213, KR217 and KR218 (mfd. by The Shin-Etsu Chemical Co., Ltd.); TSR165 and TR3357 (mfd. by Toshiba Sillicone Co., Ltd.); and Y-1587, FZ-3701 and FZ-3704 (mfd. by Unitika Ltd.). Examples of a partially hydrolyzed condensation product of ethyl silicate having an ethoxysilyl group include Ethyl silicate 40, HAS-1, HAS-6 and HAS-10 (mfd. by Nippon Colcoat Co.).

Examples of a reaction product of the above-mentioned silane compounds include a product obtained by reacting a silane coupling agent having an amino group with a silane coupling agent having an epoxy group; a product obtained by reacting a silane coupling agent having an amino group with an epoxy group-containing compound such as ethylene oxide, butylene oxide, epichlorohydrin, epoxylated soybean oil or Epikote 828 or Epikote 1001 (mfd. by Petrochemical Shell Epoxy Co.); and a product obtained by reacting an epoxy group-containing silane coupling agent with an amine selected from among aliphatic amines such as ethylamine, diethylamine, triethylamine, ethylenediamine, hexanediamine, diethylenetriamine, triethylenetetramine or tetraethylenepentamine, aromatic amines such as aniline or diphenylamine, alicyclic amines such as cyclopentylamine or cyclohexylamine and ethanolamines.

The amount of these silane compounds, condensation products thereof and reaction products thereof can be used in an arbitrary amount without limitation. However these compounds are generally used in an amount of 100 parts or below, preferred 50 parts or below, per 100 parts of the solid components (A) and (B).

The topcoat clear coating can further contain an UV absorber or a photostabilizer so as to further improve its weathering resistance.

The UV absorber can be selected from known ones. Preferred examples thereof include benzophenone, triazole, phenylsalicylate, diphenylacrylate and acetophenone UV absorbers.

The photostabilizer can be selected from known ones. Examples thereof include bis(2,2,6,6-tetramethyl-4-piperidyl) sebacate, bis(1,2,2,2,6,6-pentamethyl-4-piperidyl) sebacate, bis(1,2,2,6,6-pentamethyl-4-piperidyl)2-(3,5-di-tert-butyl-4-hydroxybenzyl) -2-n-butylmalonate, tetrakis(2,2,6,6 -tetramethyl-4-piperidyl)-1,2,3,4-butane tetracarboxylate and tetrakis(1,2,2,6,6-pentamethyl-4-piperidyl) -1,2,3,4-butane tetracarboxylate. Any one of these compounds or a mixture thereof can be used.

The weathering resistance of the topcoat clear coating can be further improved by adding the UV absorber and photostabilizer thereto.

The UV absorber can generally be used in an amount of from 0.1 to 10 parts, preferred from 1 to 5 parts, per 100 parts of the solid components of the topcoat clear coating. On the other hand, the photostabilizer can generally be used in an amount of from 0.1 to 10 parts, preferred from 1 to 5 parts, per 100 parts of the solid components of the topcoat clear coating.

The topcoat clear coating can furthermore contain various additives such as a diluent, anti-cratering agent or leveling agent; fibrous compounds such as nitrocellulose or cellulose acetate butyrate; and resins such as epoxy resin, melamine resin, vinyl chloride resin, chlorinated polypropylene, chlorinated rubber or polyvinyl butyral.

The topcoat clear coating comprising the above-mentioned components can be produced in an arbitrary method without limitation. For example, component (A) can be cold-blended with the component (B). Alternatively, a mixture of the components (A) and (B) can be heated (hot-blended) so as to induce partial reactions. Then the component (C) is mixed therewith.

The coat containing the metallic powder and/or coloring pigment (i.e., the base coat) is described below.

This base coat is not specifically restricted. For example, it can comprise a mixture of a hydroxyl group-containing resin, for example, aminoalkyd resin, oil-free alkyl resin, heat-hardening acryl resin, heat-hardening urethane resin, nitrocellulose lacquer, modified acryl lacquer, straight acryl lacquer, cold hardening urethane resin, acryl enamel resin, oxidative hardening alkyd resin, oxidative hardening modified (for example, CAB) alkyd resin, cold- or heat-hardening fluorine resin, hydrolyzable silyl group-containing resin and a hydrolyzable silyl group-containing polymer as the major component together with a metallic powder or a coloring pigment. The coat can be in an arbitrary form, for example, a solution coat wherein an organic solvent is employed as a medium, a nonaqueous dispersion coat, a multi-solution coat, a powdery coat, a slurry coat or an aqueous coat.

The above-mentioned metallic powder and coloring pigment can be selected from among those conventionally employed in the art. Examples of the metallic powder include aluminum powder, copper powder and mica powder, while examples of the coloring pigment include organic pigments such as phthalocyanine blue, toluidine red and benzidine yellow and inorganic ones such as titanium oxide, carbon black and red oxide. Any one of these metallic powders and coloring pigments or a mixture thereof can be used.

The weathering resistance of the base coat can be further improved by adding the above-mentioned UV absorber or photostabilizer thereto.

Furthermore, the coat containing the metallic powder and/or the photostabilizer can contain the above-mentioned silane compounds, condensation products thereof, reaction products thereof or mixtures thereof so as to improve the adhesiveness of the resulting coating to the topcoat clear coating. In this case, these additives can be added in an amount of 50 parts or less, preferred 20 parts or less, per 100 parts of the coat containing the metallic powder and/or the photostabilizer.

A process for the production of the coated material of the present invention coated with the above-mentioned topcoat clear coating and base coat is described below.

The coated material of the present invention can be arbitrarily produced without restriction. For example, the above-mentioned coat containing the metallic powder and/or the coloring pigment is applied to a substrate and then allowed to stand for several minutes (setting). Next, the topcoat clear coating is further applied thereto by the wet-on-wet system and then hardened by heating (two-coat, one-bake system). Alternatively, the coat containing the metallic powder and/or the coloring pigment is applied to the substrate and then hardened by heating. Next, the topcoat clear coating is applied thereto and hardened by heating (two-coat, two-bake system).

The application of the topcoat clear coating can be conducted in a conventional manner, for example, immersing, spraying, brushing, roll coating or flow coating. Then it is hardened at a temperature of 30° C or above, preferred from 55° to 350° C.

The thickness of the coating is not specified. Although the thickness of the coating containing the metallic powder and/or the coloring pigment varies depending on the purpose of the coated material and thus cannot be generally specified, it preferably ranges from 10 to 30 μm, from the viewpoint of, for example, shielding effect. Similarly, the thickness of the topcoat clear coating cannot be generally specified. However, it preferably ranges from 20 to 50 μm, from the viewpoint of, for example, durability.

The coating thus formed is excellent in various properties including appearance, acid resistance and weathering resistance.

This coating can be formed on, for example, automobiles, industrial machines and appliances. As described above, it is used in overcoat finishing stages.

The coated material of the present invention will be described in detail below based on the following Examples.

PRODUCTION EXAMPLE 1

Synthesis of alkoxysilyl group-containing acrylic copolymer (B)

45.9 parts of xylene was fed into a reactor provided with a stirrer, a thermometer, a reflux condenser, a nitrogen gas inlet and a dropping funnel. Then it was heated to 110° C. while introducing nitrogen gas. Next, the following mixture (b) was continuously added dropwise thereto from a dropping funnel within five hours.

| Mixture (b) | (part) |
| --- | --- |
| styrene | 12.8 |
| methyl methacrylate | 50.1 |
| stearyl methacrylate | 6.9 |
| γ-methacryloxypropyltrimethoxysilane | 30.2 |
| xylene | 13.5 |
| 2,2'-azobisisobutylonitrile | 4.5 |

After the completion of the addition of the mixture (b), 0.5 part of 2,2'-azobisisobutyronitrile and 5 parts of toluene were continuously added dropwise thereto within 1 hour. After the completion of the addition, the mixture was aged at 110° C. for 2 hours and then cooled. Xylene was added to the resin solution so as to adjust the solids content thereof to 60%.

Table 1 shows the properties of the resin solution (b) thus obtained.

PRODUCTION EXAMPLE 2

Synthesis of hydroxyl group-containing acrylic resin (A)

The procedure described in Production Example 1 was repeated except that 45.9 parts of xylene was replaced with 31.3 parts of butyl acetate and 9.5 parts of xylene and then the following mixture (a-1) was added.

| Mixture (a-1) | (part) |
| --- | --- |
| xylene | 18 |
| styrene | 28.3 |
| methyl methacrylate | 7.1 |
| n-butyl methacrylate | 32.5 |
| methacrylic acid | 0.3 |
| Placcel FM-1* | 31.8 |
| 2,2'-azobisisobutyronitrile | 1.8 |

*: 2-hydroxyethylmethacrylate/ε-caprolactoneadduct (1/1) mfd. by Daicel Chemical Industries, Ltd.).

After the completion of the addition of the mixture (a-1), 0.2 part of 2,2'-azobisisobutyronitrile and 3.8 parts of toluene were continuously added dropwise thereto within 1 hour. After the completion of the addition, the obtained mixture was aged at 110° C. for 2 hours and then cooled. Xylene was added so as to adjust the solids content of the resin solution to 60%.

Table 1 shows the properties of the resin solution (a-1) thus obtained.

PRODUCTION EXAMPLE 3

Synthesis of hydroxyl group-containing acrylic resin (A)

The procedure described in Production Example 1 was repeated except that 45.9 parts of xylene was replaced with 31.3 parts of butyl acetate and 9.5 parts of xylene. Then the following mixture (a-2) was added and polymerized to thereby give a resin solution (a-2).

Table 1 shows the properties of the resin solution (a-2) thus obtained.

| Mixture (a-2) | (part) |
|---|---|
| xylene | 18 |
| styrene | 14 |
| methyl methacrylate | 7 |
| n-butyl acrylate | 26 |
| methacrylic acid | 0.3 |
| Placcel FM-1 | 39.7 |
| 2-hydroxyethyl methacrylate | 13 |

TABLE 1

| Resin solution | b | a-1 | a-2 |
|---|---|---|---|
| Properties: | | | |
| Nonvolatile content (%) | 60 | 60 | 60 |
| Viscosity (28° C., cps) | 900 | 4,400 | 5,100 |
| Acid number (mg KOH/g sol) | 0 | 2.0 | 2.0 |
| Hydroxyl number (mg KOH/g solid) | 0 | 73 | 148 |
| Number-average molecular weight | 6,000 | 10,000 | 10,000 |
| Color number (Gardner) | <1 | <1 | <1 |

EXAMPLES 1 TO 5 AND COMPARATIVE EXAMPLES 1 TO 2

Components specified in Table 2 were mixed together to thereby give each topcoat clear coating.

A coated sheet obtained by coating a defatted and phosphated mild steel sheet with an automotive epoxyamide cation electrodeposited primer and an intercoat surfacer was employed as a test sample. A base coat specified in Table 2 was applied onto said test sample and then each topcoat clear coating specified in Table 2 was further applied thereon by the wet-on-wet system.

After setting for 20 minutes, the sample was baked at 140° C. for 30 minutes. The dry thickness of the resulting base coating was approximately 15 μm while that of the topcoat clear coating was approximately 30 μm.

The coated material thus obtained was evaluated in the following manner. Table 2 shows the results.

Appearance

Gloss and definition were evaluated with the naked eye. ○ means good, Δ means moderate and b means poor.

Adhesiveness

A checkerboard (2 mm×2 mm) peeling test was conducted with the use of adhesive cellophane tape. 25/25 scored 10 while 0/25 scored 0.

Hardness

Determined in accordance with JIS K 5400.

Acid resistance

Five to six drops of 38% $H_2SO_4$ were spotted and allowed to stand at room temperature for 24 hours. After wiping, the traces were examined and the acid resistance was evaluated based on the following criteria.

○: Normal.

Δ: Trace remained and gloss was somewhat deteriorated.

x: Gloss was completely deteriorated.

Staining resistance

Engine oil which had been run approximately 5000 km was applied to a sample and the sample was then allowed to stand at 50° C. under RH 98% for 24 hours. Then the sample was taken out and the engine oil was wiped off. The color difference between the sample and an untreated one was determined by a color difference meter (mfd. by Nippon Denshoku Kogyo K.K.) and evaluated.

Weathering resistance

UV irradiation at 70° C. for 8 hours and water cohesion at 50° C. in the dark for 4 hours were repeated with the use of UVCON (mfd. by Atlas Co.). After conducting the accelerated weathering test for 700 hours and for 2800 hours, the gloss sustaining ratio was evaluated.

Contact angle

The contact angle (°) to water was determined with a contact angle meter CA-P (mfd. by Kyowa Kaimen Kagaku K.K.).

TABLE 2

| Example No. | 1 | 2 | 3 | 4 | 5 | Comparative Example 1 | Comparative Example 2 |
|---|---|---|---|---|---|---|---|
| Base coat | Acryl melamine resin coat *1 | | | | Alkyd melamine resin coat *2 | Acryl melamine resin coat *1 | Alkyd melamine resin coat *2 |
| Composition of topcoat clear coating (parts) | | | | | | | |
| Resin solution (b) | 36 | 36 | 36 | 36 | 36 | Marketed automotive two-coat one-bake coat | Not coated |
| Resin solution (a-1) | — | — | — | 24 | — | | |
| Resin solution (a-2) | 24 | 24 | 24 | — | 24 | | |
| DP8R *3 | 0.36 | — | 0.36 | 0.36 | 0.36 | | |
| Farmin DM20 *4 | 0.36 | — | 0.36 | 0.36 | 0.36 | | |
| TN 801 *5 | — | 0.72 | — | — | — | | |
| f *6 | — | 0.72 | — | — | — | | |
| Tinuvin 900 *7 | 0.36 | 0.36 | 0.36 | 0.36 | 0.36 | | |
| Tinuvin 144 *8 | 0.36 | 0.36 | 0.36 | 0.36 | 0.36 | | |
| PS 339.7 *9 | — | — | 1.8 | — | — | | |
| Solvesso #100 *10 | 34.96 | 34.24 | 33.16 | 34.96 | 34.96 | | |
| Methyl orthoacetate | 1.8 | 1.8 | 1.8 | 1.8 | 1.8 | | |
| Methanol | 1.8 | 1.8 | 1.8 | 1.8 | 1.8 | | |
| Evaluation | | | | | | | |
| Appearance | ○ | ○ | ○ | ○ | ○ | ○ | ○ |
| Adhesiveness | 10 | 10 | 10 | 10 | 10 | 10 | — |
| Hardness (Pencil) | 2H | 3H | 2H | 3H | 2H | 2H | H |

TABLE 2-continued

| Example No. Base coat | 1 | 2 | 3 | 4 | 5 | Comparative Example 1 | Comparative Example 2 |
|---|---|---|---|---|---|---|---|
| | | Acryl melamine resin coat *1 | | | Alkyd melamine resin coat *2 | Acryl melamine resin coat *1 | Alkyd melamine resin coat *2 |
| Acid resistance | ○ | ○ | ○ | ○ | ○ | △ | × |
| Staining resistance | 0.9 | 1.0 | 0.5 | 1.1 | 0.9 | 2.4 | 4.7 |
| Weathering resistance: | | | | | | | |
| 700 hours | 98 | 97 | 99 | 98 | 98 | 98 | 22 |
| 2800 hours | 90 | 92 | — | 89 | 90 | 85 | — |
| Contact angle to water (°) | 80 | 78 | 97 | 80 | 80 | 78 | 82 |

*1: Marketed acryl melamine resin coat (silver metallic base).
*2: Marketed alkyd melamine resin coat (white).
*3: Dioctyl acid phosphate mfd. by Daihachi Kagaku Kogyo K.K.
*4: N,N-dimethyldodecyamine mfd. by Kao Soap Co., Ltd.
*5: Dioctyltin maleate mfd. by Sakai Kagaku Kogyo K.K.
*6: Product obtained by reacting aminosilane (A-1100 mfd. by UCC) and epoxysilane (A187 mfd. by UCC).
*7: Benzotriazole UV absorber mfd. by Ciba-Geigy.
*8: Hindered amine photostabilizer mfd. by Ciba-Geigy.
*9: Terminal silanol polydimethylsiloxane mfd. by Chisso Corporation
*10: Higher aromatic solvent of high b.p. mfd. by Exxon.

As Table 2 indicates, the coated material of the present invention is superior in acid resistance and staining resistance to conventional ones and thus highly useful in practice. The topcoat clear coating to be sued in the present invention is a practically excellent two-coat, one-bake coat.

The coated material of the present invention is excellent in appearance, weathering resistance, acid resistance, staining resistance, adhesiveness and hardness.

While the invention has been described in detail and with reference to specific embodiments thereof, it will be apparent to one skilled in the art that various changes and modifications can be made therein without departing from the spirit and scope thereof.

What is claimed is:

1. A coated material obtained by applying a coat containing a metallic power or a coloring pigment or both to a substrate and further applying a topcoat clear coating thereon, wherein said topcoat clear coating is a siloxy or siloxane crosslinking thermocurable coating which comprises (A) a hydroxyl group-containing acrylic resin;
   (B) an alkoxysilyl group-containing copolymer represented by formula:

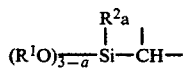

where $R^1$ represents $C_{1-10}$ alkyl group; $R^2$ represents a monovalent hydrocarbon group selected from the group consisting of hydrogen atom, alkyl group, aryl group, and aralkyl group; and a represents 0 or integer of 1 or 2; and
   (C) curing catalyst.

2. A coated material as claimed in claim 1, wherein said hydroxyl group-containing acrylic resin (A) has a hydroxyl number of from 10 to 150 mg KOH/g and a number-average molecular weight of from 1,500 to 40,000.

3. A coated material as claimed in claim 1, wherein said alkoxysilyl group-containing acrylic copolymer (B) contains 5 to 90% by weight of units (s) derived from an alkoxysilylvinyl monomer which has polymerizable unsaturated double bond(s) and alkoxysilyl group(s) in a molecule.

4. A coated material as claimed in claim 1, wherein said coring catalyst (C) is selected for the group consisting of organotin compounds, acidic phosphate esters, products or mixtures obtained by reacting an acidic phosphate with an amine, saturated or unsaturated polyvalent carboxylic acids, saturated or unsaturated polyvalent carboxylic acid anhydrides, reactive silicone compounds, organic titanates, organic aluminum compounds and mixtures thereof.

5. A coated material as claimed in claim 1, wherein said topcoat clear coating contains a hydrolyzable ester as a dehydrating agent and an alkyl alcohol as a solvent.

6. A coated material as claimed in claim 1, wherein said topcoat clear coating contains an UV absorber or a photostabilizer or both.

7. A coated material as claimed in claim 1, wherein said top coat clear coating contains, in addition to the crosslinking thermocurable coating comprising (A) and (B), a polyorganosiloxane as a surface improving agent for improving surface properties.

8. A coated material as claimed in claim 1, wherein said top coat clear coating contains, in addition to the crosslinking thermocurable coating comprising (A) and (B), a silane compound, a condensation product thereof, a reaction product thereof or a mixture thereof.

9. A coated material as claimed in claim 1, wherein said coat containing a metallic powder or a coloring pigment or both further contains a silane compound, a condensation product thereof, a reaction product thereof or a mixture thereof.

10. A coated material obtained by applying a coat containing a metallic powder or a coloring pigment or both to a substrate and further applying a topcoat clear coating thereon, wherein said topcoat clear coating is a siloxy or siloxane crosslinking thermocurable coating which comprises (A) a hydroxyl group-containing acrylic resin;
   (B) an alkoxysilyl group-containing copolymer represented by formula:

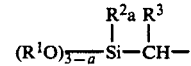

wherein $R^1$ represents $C_{1-10}$ alkyl group; $R^2$ and $R^3$ each, which may be the same or different, represents a monovalent hydrocarbon group selected from the group consisting of hydrogen atom, alkyl group, aryl group, and aralkyl group; and a represents 0 or integer of 1 or 2; and (C) curing catalyst.

11. A coated material as claimed in claim 10, wherein said hydroxyl group-containing acrylic resin (A) has a hydroxyl number of from 10 to 150 mg KOH/g and a number-average molecular weight of from 1,500 to 40,000.

12. A coated material as claimed in claim 10, wherein said alkoxysilyl group-containing acrylic copolymer (B) contains 5 to 90% by weight of unit(s) derived from an alkoxysilylvinyl monomer which has polymerizable unsaturated double bond(s) and alkoxysilyl group(s) in a molecule.

13. A coated material as claimed in claim 10, wherein said the group consisting of catalyst (C) is selected from the group consisting of organotin compounds, acidic phosphate esters, products or mixtures obtained by reacting an acidic phosphate with an amine, saturated or unsaturated polyvalent carboxylic acids, saturated or unsaturated polyvalent carboxylic acid anhydrides, reactive silicone compounds, organic titanates, organic aluminum compounds and mixtures thereof.

14. A coated material as claimed in claim 10, wherein said topcoat clear coating contains a hydrolyzable ester as a dehydrating agent and an alkyl alcohol as a solvent.

15. A coated material as claimed in claim 10, wherein said topcoat clear coating contains an UV absorber or a photostabilizer or both.

16. A coated material as claimed in claim 10, wherein said top coat clear coating contains, in addition to the crosslinking thermocurable coating comprising (A) and (B), a polyorganosiloxane as a surface improving agent for improving surface properties.

17. A coated material as claimed in claim 10, wherein said top coat clear coating contains, in addition to the crosslinking thermocurable coating comprising (A) and (B), a silane compound, a condensation product thereof, a reaction product thereof or a mixture thereof.

18. A coated material as claimed in claim 10, wherein said coat containing a metallic powder or a coloring pigment or both further contains a silane compound, a condensation product thereof, a reaction product thereof or a mixture thereof.

* * * * *